US010169345B2

(12) United States Patent
Wideman

(10) Patent No.: US 10,169,345 B2
(45) Date of Patent: Jan. 1, 2019

(54) MOVING DATA FROM LINEAR TAPE FILE SYSTEM STORAGE TO CLOUD STORAGE

(71) Applicant: Quantum Corporation, San Jose, CA (US)

(72) Inventor: Roderick Wideman, Shakopee, MN (US)

(73) Assignee: Quantum Corporation, San Jose, CA (US)

( * ) Notice: Subject to any disclaimer, the term of this patent is extended or adjusted under 35 U.S.C. 154(b) by 536 days.

(21) Appl. No.: 14/666,561

(22) Filed: Mar. 24, 2015

(65) Prior Publication Data

US 2016/0283493 A1    Sep. 29, 2016

(51) Int. Cl.
*G06F 17/30*    (2006.01)
(52) U.S. Cl.
CPC .............................. *G06F 17/30079* (2013.01)
(58) Field of Classification Search
CPC ................................................ G06F 17/30079
See application file for complete search history.

(56) References Cited

U.S. PATENT DOCUMENTS

| 9,037,538 | B2 * | 5/2015 | Sampathkumar | G06F 3/0617 |
| | | | | 707/609 |
| 9,372,631 | B1 * | 6/2016 | Rozendorn | G06F 3/0619 |
| 2012/0311189 | A1 * | 12/2012 | Yamada | G06F 21/6272 |
| | | | | 709/248 |
| 2013/0290261 | A1 * | 10/2013 | Wideman | G06F 17/30197 |
| | | | | 707/640 |
| 2016/0225403 | A1 * | 8/2016 | Hostetter | G11B 20/0021 |

* cited by examiner

*Primary Examiner* — Mark D Featherstone
*Assistant Examiner* — Faezeh Forouharnejad
(74) *Attorney, Agent, or Firm* — Eschweiler & Potashnik, LLC

(57) ABSTRACT

Example apparatus and methods access a Linear Tape File System (LTFS) repository that stores data associated with an external entity (e.g., file system, application). Data is copied from the LTFS repository, selectively converted to a form associated with a cloud repository, and provided to the cloud repository. A mapping between corresponding addresses in the LTFS repository and cloud repository is established. Requests by the external entity for data may be satisfied from either the LTFS repository or the cloud repository until a changeover event is detected and are then satisfied from the cloud repository afterwards. The external entity runs on a different computer than the method. The method is transparent to the external entity, is performed independent of the external entity, and continues under its own control until a selected amount of data is moved from the LTFS repository to the cloud repository.

10 Claims, 8 Drawing Sheets

MOVING DATA FROM LINEAR TAPE FILE SYSTEM STORAGE TO CLOUD STORAGE

BACKGROUND

The amount of data stored continues to grow. Thus, data storage devices continue to evolve and proliferate. While new devices with new and different capabilities have become available, a significant amount of data still is and likely will continue to be stored using the linear tape file system (LTFS). Data may be stored using the LTFS on actual physical tapes or on virtual tapes.

LTFS refers to both the format of data recorded on physical or virtual magnetic tapes and to software that uses the format to provide a file system interface to data stored on the physical or virtual magnetic tapes. The LTFS format is a self-describing tape format associated with tape archives. The LTFS format defines the organization of data and metadata. In LTFS, files are stored in a hierarchical directory structure. LTFS allows direct access to file content and file metadata. LTFS facilitates presenting a standard file system view of the data stored in the physical or virtual tape media. This file system view makes accessing files stored on the LTFS formatted media similar to accessing files stored on other forms of storage media (e.g., spinning disks, flash drives, solid state drives (SSD)). The LTFS format includes an open description of the layout of data-structures stored on a sequential-access media. These data-structures hold the file content data and associated file metadata. Data media (e.g., LTO data tape) written using LTFS can be exchanged between systems that use the LTFS format.

One type of data storage that is becoming increasingly popular is "cloud storage." Cloud storage refers to a data storage model where digital data is stored in logical pools. The actual physical storage used to store the logical pools may span multiple devices (e.g., servers) and may include different types of storage devices. One of the purported attractions of cloud storage is that users are supposed to be able to decouple from any specific data storage hardware. The physical environment (e.g., collection of storage devices, servers) may be owned and managed by a hosting company. A hosting company that provides cloud storage is responsible for data availability, accessibility, and security. Conventionally, moving data from LTFS based storage to cloud based storage may have been inefficient and difficult to administer and may have interrupted or otherwise burdened file systems or applications that were interacting with the LTFS-based storage.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
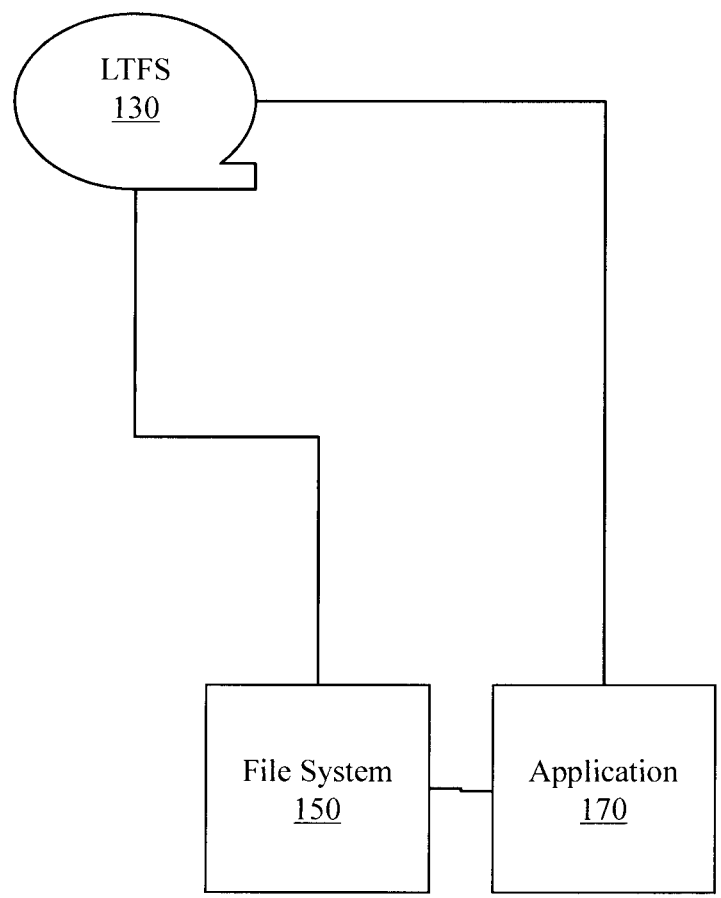
FIG. 1 illustrates a conventional system where an LTFS-based repository (e.g., tape in a tape drive) stores data for a file system or application.

Example apparatus and methods seamlessly move data stored in an LTFS-based repository to a cloud-based repository without disrupting systems and applications that rely on the LTFS-based repository. One of the challenges with moving data from an LTFS-based repository to a cloud-based repository is that there may be an enormous amount of data to be moved. It is unlikely that a process or even apparatus that was tasked with moving all the data from an LTFS-based repository to a cloud-based repository could complete the task without experiencing a failure or outage of some type. A failure in the middle of an all-or-nothing data transfer could be catastrophic. Another challenge with moving data from an LTFS-based repository to a cloud-based repository is that the data being moved may still be active data that systems or applications may access during a copy/conversion process. However, it is infeasible to restrict access to a repository to allow a data transfer to another repository. Another challenge with moving data from an LTFS-based repository to a cloud-based repository is that the physical location of the data will change. File systems, applications or other entities interacting with the data will need to be isolated from or selectively informed of the new physical location. With the enormous amount of data to be moved, providing updates on a per piece of data basis would be overly obtrusive and disruptive. Since the LTFS-based repository and the cloud-based repository may use different addressing schemes, a mapping between addresses that use the different schemes may be required. Another challenge concerns the additional processing power and data communication bandwidth that may be required during the conversion and copying process. Conventional systems may already be operating at or near their capacity. Loading them with the additional burden of copying and converting data from an LTFS-repository to a cloud-based repository may not be feasible.

A cloud-based repository may use an object based approach. Thus, example apparatus and methods may track object identifiers for data that maps back to data on a physical or virtual tape in the LTFS-based repository. In one embodiment, data may be accessed from the LTFS-based repository until a changeover event occurs. When the changeover event occurs, example apparatus and methods may redirect requests that were intended for the LTFS-based repository to the cloud-based repository. A changeover event may occur when, for example, a complete file has been transferred, a complete tape has been transferred, a complete object has been created in the cloud-based repository, a complete virtual tape library (VTL) has been transferred, or at other times. In one embodiment, the changeover event may be user-configurable. Once a change-over has been complete, the LTFS source may be updated to become read-only. Since copying and converting data from an LTFS-repository to a cloud-based repository may not occur instantaneously, it is possible that the data being copied and converted may be accessed or updated during the copying and conversion. To handle this case, information may be stored that identifies data that is changed during or following that data being copied. The information may be used to control whether the data needs to be recopied or reconverted.

"Object", as used herein, refers to the usage of object in computer science. From one point of view, an object may be considered to be a location in a physical memory having a value and referenced by an identifier.

FIG. 1 illustrates a conventional system where an LTFS-based repository 130 (e.g., tape in a tape drive) stores data for a file system 150 or application 170. The application 170 and the file system 150 may both communicate directly with the LTFS-based repository 130 or some applications may interact with the LTFS-based repository 130 via the file system 150. In FIG. 1, both the application 170 and the file system 150 have intelligence for interacting with the LTFS-based repository 130. At some point, the owner(s) or administrator(s) of file system 150 or application 170 may wish to migrate from the LTFS-based repository 130 to a cloud-based repository. Conventionally, both the application 170 and the file system 150 would need to be updated (e.g., patched) with intelligence for dealing with the conversion and the copying and for interacting with the new cloud-based repository. This conventional approach produced at least the challenges described above.

Figure 2:
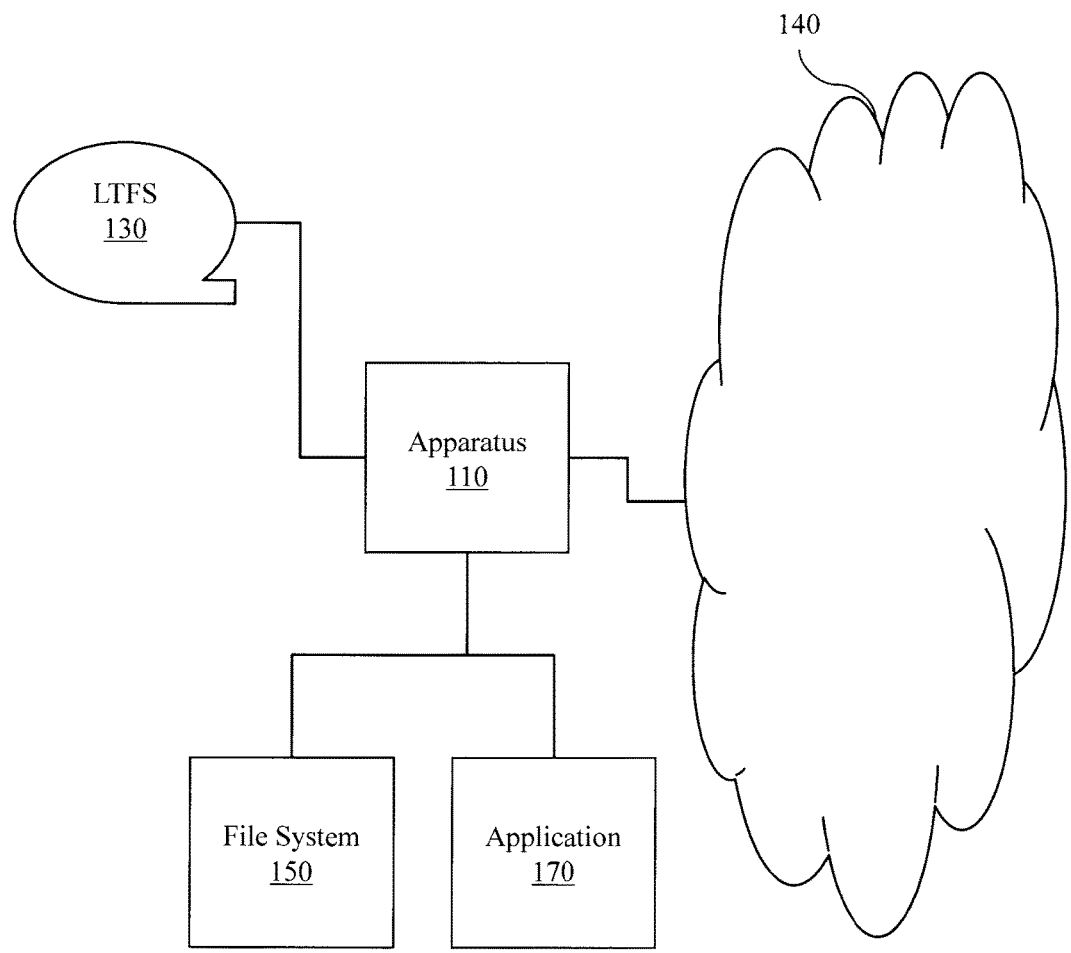
FIG. 2 illustrates an apparatus for transferring data from an LTFS-based repository to a cloud-based repository without disrupting a file system or application.

FIG. 2 illustrates an apparatus 110 for transferring data from an LTFS-based repository 130 to a cloud-based repository 140 without disrupting access to data by a file system 150 or application 170. Apparatus 110 is tasked with preserving a consistent view of the data stored by LTFS-based repository 130 for application 170 and file system 150. Apparatus 110 is also tasked with copying data from the LTFS-based repository 130 to the cloud-based repository 140 and for performing any conversion that may be required to do so. While the copy and conversion is in progress, some data may be in both the LTFS-based repository 130 and in the cloud-based repository 140. Apparatus 110 may maintain a mapping of addresses that correlates the data that is located in both places. Apparatus 110 may satisfy requests from file system 150 or application 170 for data that is being copied and converted from LTFS-based repository 130 or from cloud-based repository 140.

There may be an enormous amount of data stored in LTFS-based repository 130. Thus, it is unlikely that the entire amount of data will be copied and converted in a short period of time. In fact, for some organizations, the copy and conversion process may take years! Therefore, apparatus 110 may take an incremental approach where a certain quanta of data (e.g., file, object, tape, tape library, virtual tape library (VTL)) are copied and converted at a time. When a selected amount of data has been copied and converted, apparatus 110 may detect a changeover event. When the changeover event is detected, apparatus 110 may stop satisfying requests for data that generated the changeover event from the LTFS-based repository 130 and start satisfying those requests from the cloud-based repository 140. Both the application 170 and the file system 150 may remain unaware of the changeover event because their interface to apparatus 110 will remain consistent. Once a changeover event is complete, the data in the LTFS-based repository 130 may be marked as "read-only" or even as "read-only, out-of-date."

Figure 3:
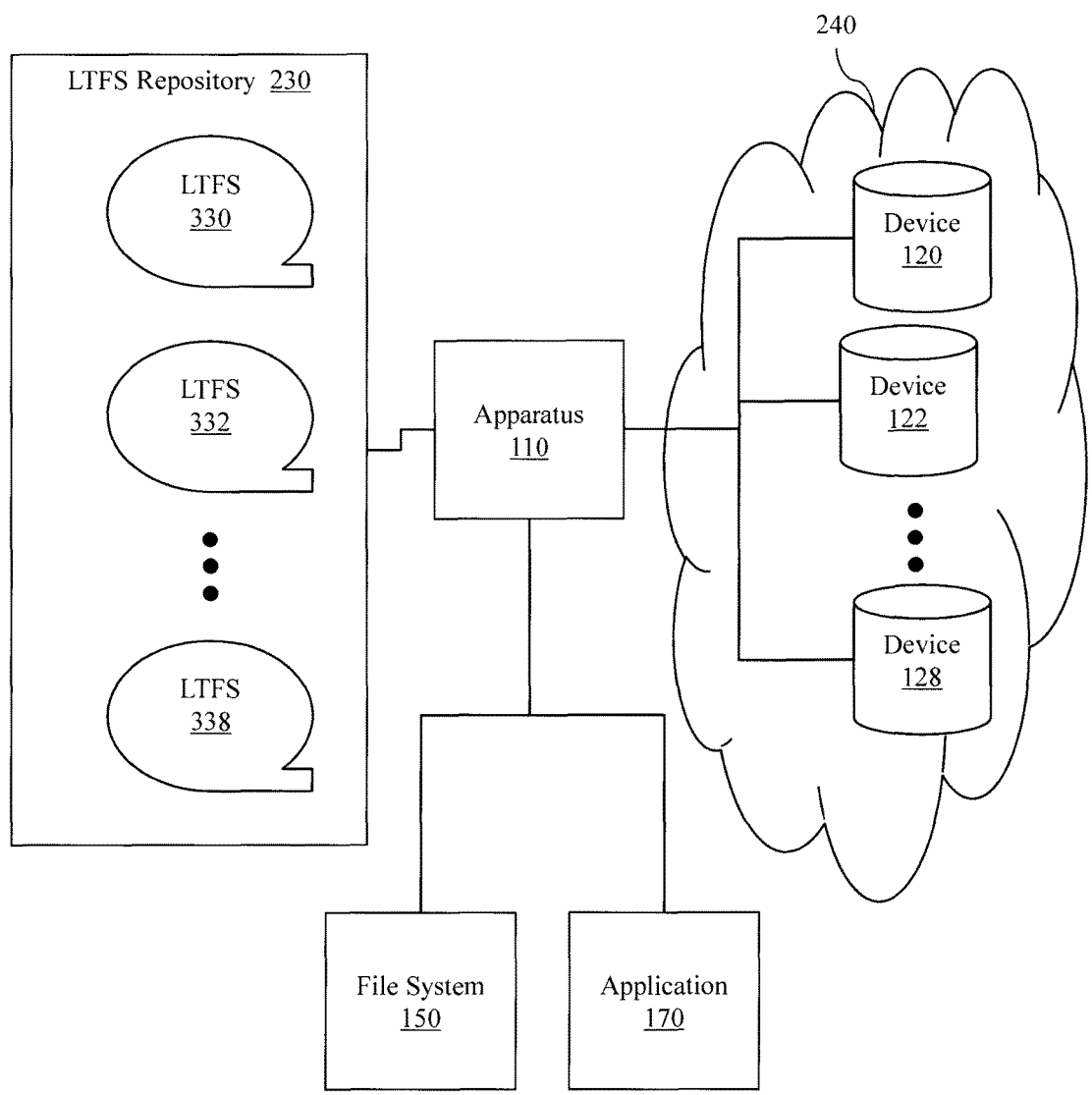
FIG. 3 illustrates an apparatus for transferring data from an LTFS-based repository to a cloud-based repository without disrupting a file system or application.

FIG. 3 illustrates apparatus 110 interacting with a more complex environment where an LTFS-based repository 230 may actually include a number of LTFS devices (e.g., device 330, device 332, . . . device 338) and where a cloud-based repository 240 may also include a number of devices (e.g., device 120, device 122, . . . device 128). Regardless of the complexity of LTFS-based repository 230 or cloud-based repository 240, the apparatus 110 presents the same interface to file system 150 and application 170 and allows them to continue operating as though the copying and conversion process was not taking place. File system 150 and application 170 may be unaware that the copying and conversion is occurring. Apparatus 110 and methods that run on apparatus 110 operate independent of file system 150 and application 170, meaning they are self-controlled and not controlled by file system 150 or application 170. While apparatus 110 may satisfy requests for data from file system 150 or application 170, apparatus 110 selects when, how, and which data to move based on its own intelligence, plan, and initiative.

Figure 4:
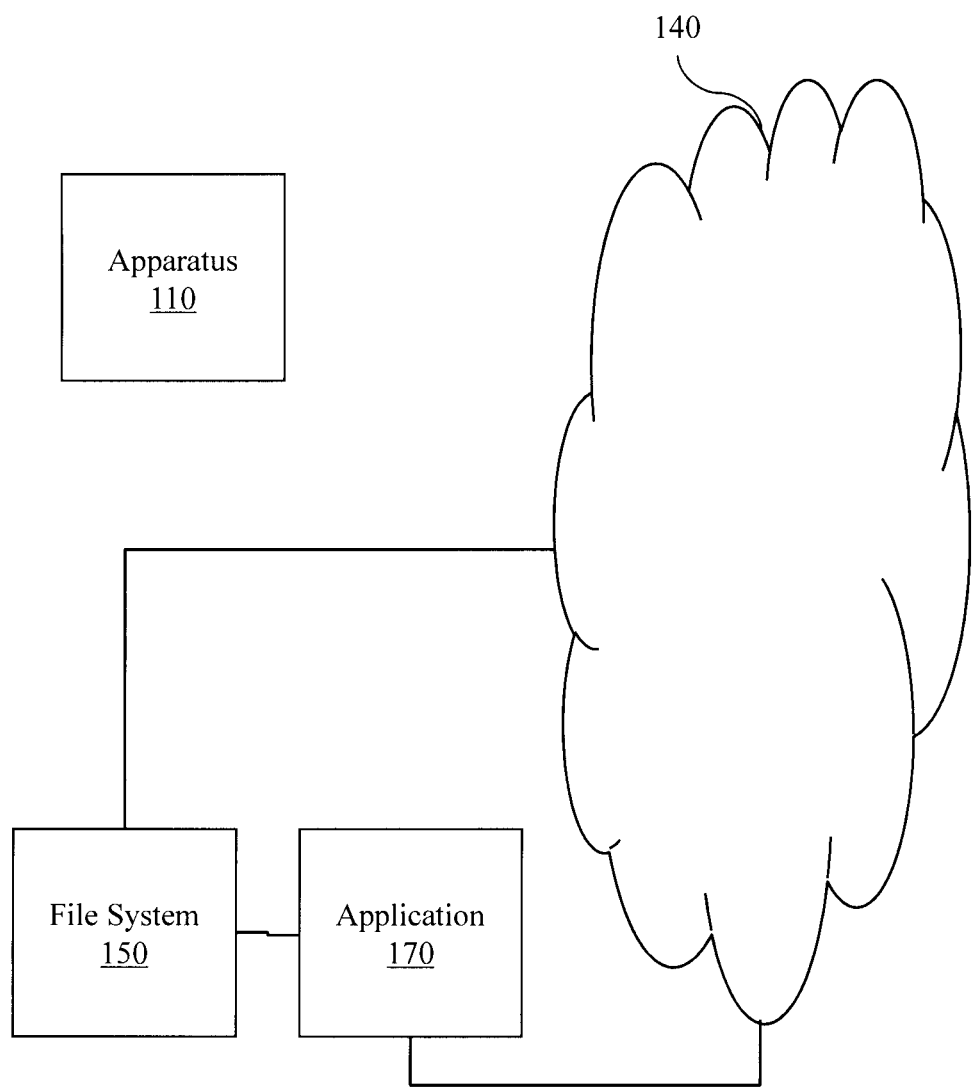
FIG. 4 illustrates a file system and application interacting with a cloud-based storage repository after conversion from an LTFS-based repository is complete.

FIG. 4 illustrates a file system 150 and application 170 interacting with a cloud-based storage repository 140 after conversion from an LTFS-based repository is complete. The apparatus 110 has been removed. In one embodiment the apparatus 110 may remain in place to facilitate future copying and conversion. In one embodiment the apparatus 110 may remain in place so that the file system 150 and application 170 may continue to use the addressing scheme and even addresses that were used when the data was stored in an LTFS-based repository. This situation may occur when it is difficult or impossible to update addresses or addressing schemes for file system 150 or application 170. Data that was being copied and converted may have been written during the copying and conversion process. Thus, in one embodiment, information about writes that occurred while data was being copied and converted may be maintained to facilitate re-doing the copying or conversion if required.

Thus, example apparatus and methods improve over conventional systems by allowing seamless, transparent movement of data from an LTFS-based repository to a cloud-based repository without disturbing a file system or application that were relying on the LTFS-based repository to store data. Rather than placing an extra burden on a file system or application or hardware upon which the file system or application run, a separate apparatus controls the movement of the data. The separate apparatus runs under its own control and is not directed by the file system or applications that rely on the LTFS-based repository. This increases the efficiency of the data movement process. The separate apparatus may run in an incremental fashion to mitigate issues with a failure before one hundred percent of the data has been moved.

Some portions of the detailed descriptions herein are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated. The physical manipulations create a concrete, tangible, useful, real-world result.

It has proven convenient at times, principally for reasons of common usage, to refer to these signals as bits, values, elements, symbols, characters, terms, or numbers. It should be borne in mind, however, that these and similar terms are to be associated with the appropriate physical quantities and are merely convenient labels applied to these quantities. Unless specifically stated otherwise, it is to be appreciated that throughout the description, terms including processing, computing, and determining refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders or concurrently with other blocks from that shown and described. Moreover, less than all the illustrated blocks may be required to implement an example methodology. Blocks may be combined or separated into multiple components. Furthermore, additional or alternative methodologies can employ additional, not illustrated blocks.

Figure 5:
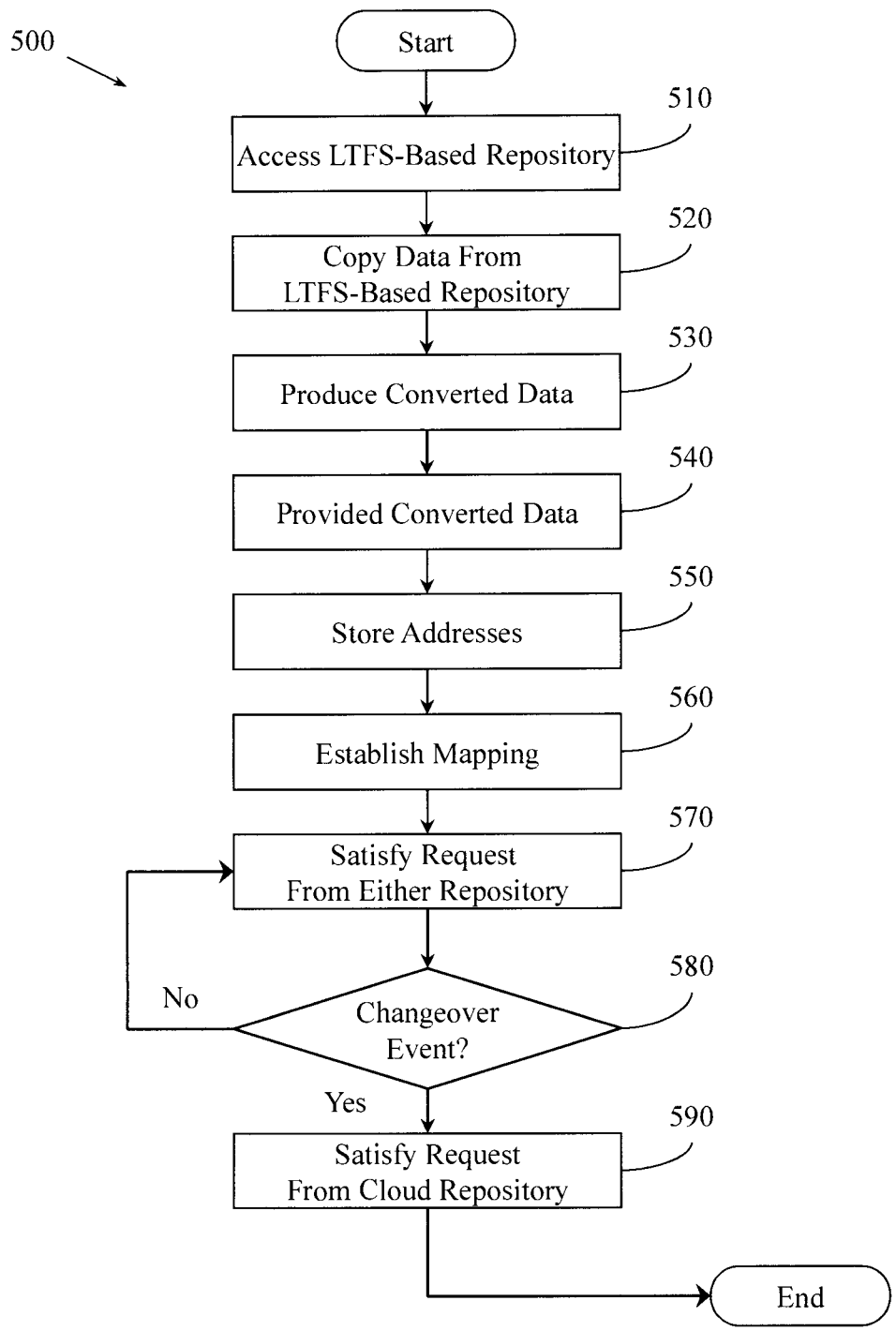
FIG. 5 illustrates an example method associated with transferring data from an LTFS-based repository to a cloud-based repository without disrupting an application or file system.

FIG. 5 illustrates a method 500 associated with transferring data from an LTFS-based repository to a cloud-based repository without disrupting a file system or application that have data stored in the LTFS-based repository. Method 500 cannot be performed in the human mind or by pencil and paper because the problem solved only exists in an operating computer data storage system. The file system or application or other entity that requests data from the LTFS-based repository run on a different computer than method 500. Method 500 is transparent to the file system or the application, meaning that they may be unaware that method 500 is running and meaning that they may continue to access data stored in the LTFS-based repository the same way they did before method 500 began to run. Method 500 is performed independent of the file system or application. This means that method 500 may run without being controlled by the file system or application, and may even run when the file system or application are not active. Method 500 may be configured to continue until a selected amount of data is moved from the LTFS-based repository to the cloud-based repository.

Method 500 includes, at 510, accessing an LTFS-based repository that stores data associated with a file system or an application. Accessing an LTFS-based repository may include receiving an address from which data can be read from the LTFS-based repository, receiving a network address from which data can be read from the LTFS-based repository, establishing a socket, remote procedure call, or other communication mechanism with the LTFS-based repository, establishing communication with an interface provided by the LTFS-based repository, or acquiring other electronic information that facilitates requesting data from the LTFS-based repository or providing data to the LTFS-based repository.

Method 500 also includes, at 520, copying a piece of electronic data from the LTFS-based repository. Copying the piece of electronic data may include, for example, reading the piece of electronic data from an address, making a request to an interface provided by the LTFS-based repository, or other computer based action.

Method 500 also includes, at 530, producing a piece of converted electronic data from the piece of electronic data. The piece of converted electronic data will be in a form associated with the cloud-based repository. In one embodiment, producing the piece of converted electronic data includes storing the piece of electronic data in an object.

Method 500 also includes, at 540, providing the piece of converted electronic data to the cloud-based repository. Providing the piece of converted electronic data may include writing the piece of converted electronic data to an address, writing the piece of converted electronic data to a network address, writing the piece of converted electronic data to a socket, sending the piece of converted electronic data to an interface provided by the cloud based repository, sending the piece of converted electronic data in a remote procedure call, or other computer based action.

Method 500 also includes, at 550, storing a first address at which the piece of electronic data can be retrieved from the LTFS-based repository using a first addressing scheme. The first addressing scheme may be unique to the LTFS-based repository and may include its own namespace, address space, or other attributes. The first addressing scheme may be used by the file system or application to access data from the LTFS-based repository.

Method 500 also includes, at 550, storing a second address at which the piece of converted electronic data can be retrieved from the cloud-based repository using a second addressing scheme. The second addressing scheme may be unique to the cloud-based repository. The second addressing scheme may include its own namespace, address space, or other attributes. The file system or application may not be able to use the second addressing scheme without being updated. Updating applications to allow them to use a new addressing scheme to interact with cloud-based storage may be a barrier to moving data from LTFS-based repositories to cloud-based repositories.

Method 500 also includes, at 560, establishing a mapping between the first address and the second address. The mapping facilitates satisfying a request for the piece of electronic data from either the LTFS-based repository or the cloud-based repository. The mapping may be stored in the apparatus running method 500.

The file system or the application may continue to run while method 500 is running. Consider that method 500 may take years to move all the data from an LTFS-based repository to a cloud-based repository. Thus, method 500 also includes, at 580, determining whether a changeover event has occurred for a piece of electronic data.

Method 500 may use different types of changeover events. One type of changeover event may be the creation of a complete object. Another type of changeover event may be the copying of a complete file from the LTFS-based repository. Another type of changeover event may be the copying of a complete tape associated with the LTFS-based repository. Yet another type of changeover event is the copying of a complete tape library associated with the LTFS-based repository. An LTFS-based repository may include a virtual tape. The type of changeover event may vary over time and may, in one embodiment, depend on the type of data being moved and converted.

Method 500 may decide when to generate changeover events. Thus method 500 may include generating a changeover event for each quanta of data moved from the LTFS-based repository to the cloud-based repository until the selected amount of data has been moved from the LTFS-based repository to the cloud-based repository.

If the changeover event has not occurred, then method 500 may continue to selectively satisfy a request by the file system or the application for the piece of electronic data from either the LTFS-based repository or the cloud-based repository at 570.

Method 500 also includes, at 590, upon detecting that the changeover event has occurred, satisfying a request by the file system or the application for the piece of electronic data from the cloud-based repository. In one embodiment, method 500 may maintain a set of mappings between members of a first set of addresses associated with the LTFS-based repository and a second set of addresses associated with the cloud-based repository after the changeover event is detected. This may facilitate leaving a file system or application unchanged even after the data has been moved. This may also facilitate leaving the LTFS-based repository intact as a backup or may facilitate using the LTFS-based repository in parallel with the cloud-based repository. For example, data may be generated in locations that do not have access to the cloud-based repository. These locations may provide data on a tape using an LTFS-based approach. Method 500 may accept this data and copy and convert it to update the cloud-based repository.

Figure 6:
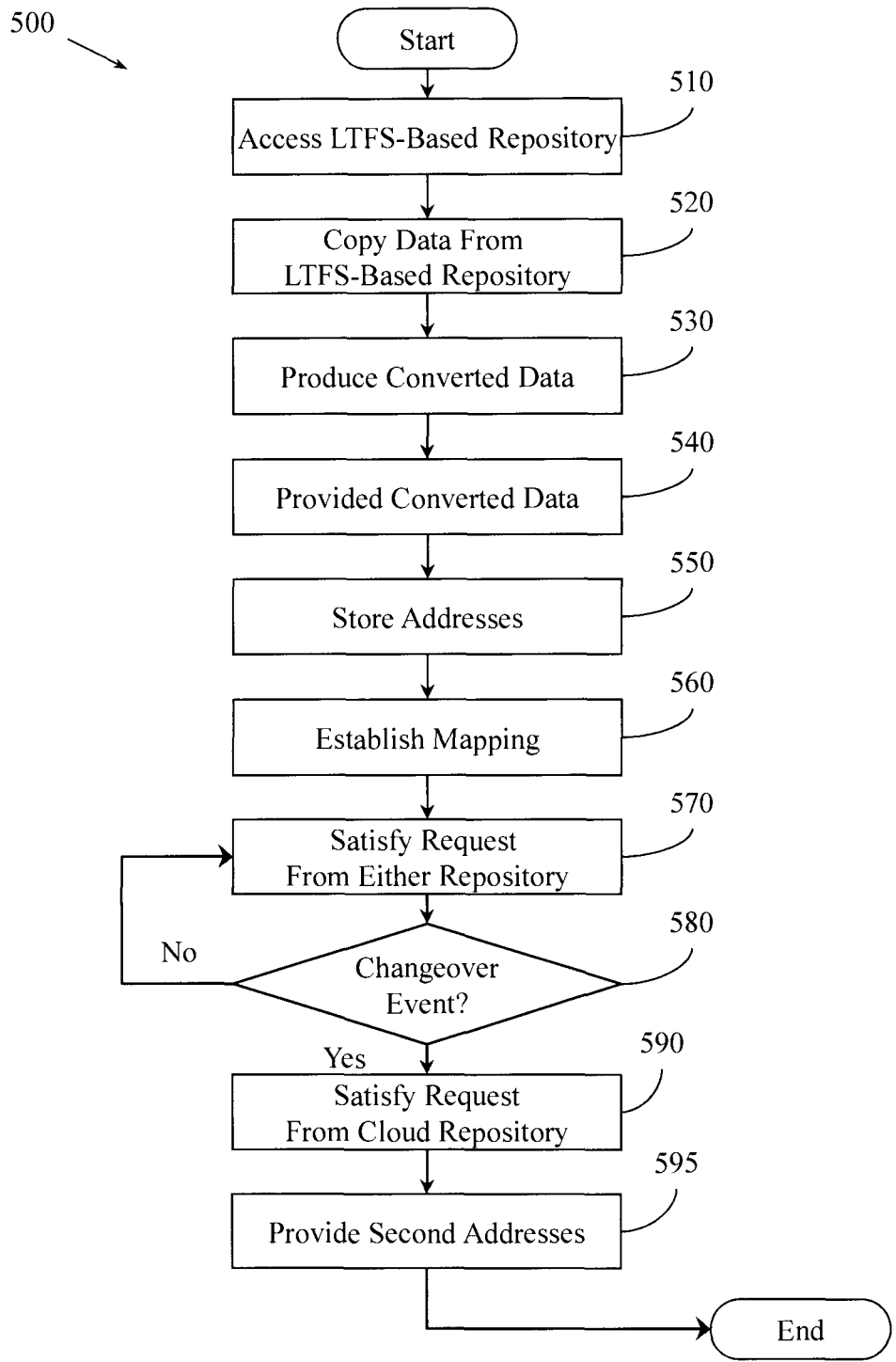
FIG. 6 illustrates an example method associated with transferring data from an LTFS-based repository to a cloud-based repository without disrupting an application or file system.

FIG. 6 illustrates another embodiment of method 500. This embodiment of method 500 includes, at 595, providing the second address or addresses to the file system or the application upon detecting the changeover event. For example, when data from an entire tape has been moved, then addresses for the data that was moved from the tape to the cloud may be provided. If the receiving entity is capable of using the cloud based addressing scheme, then method 500 may also include deleting a set of mappings between members of a first set of addresses associated with the LTFS-based repository and a second set of addresses associated with the cloud-based repository after the changeover event is detected.

In one example, a method may be implemented as computer executable instructions. Thus, in one example, a computer-readable medium may store computer executable instructions that if executed by a machine (e.g., processor) cause the machine to perform method 500. While executable instructions associated with method 500 are described as being stored on a computer-readable medium, it is to be appreciated that executable instructions associated with other example methods described herein may also be stored on a computer-readable medium.

Figure 7:
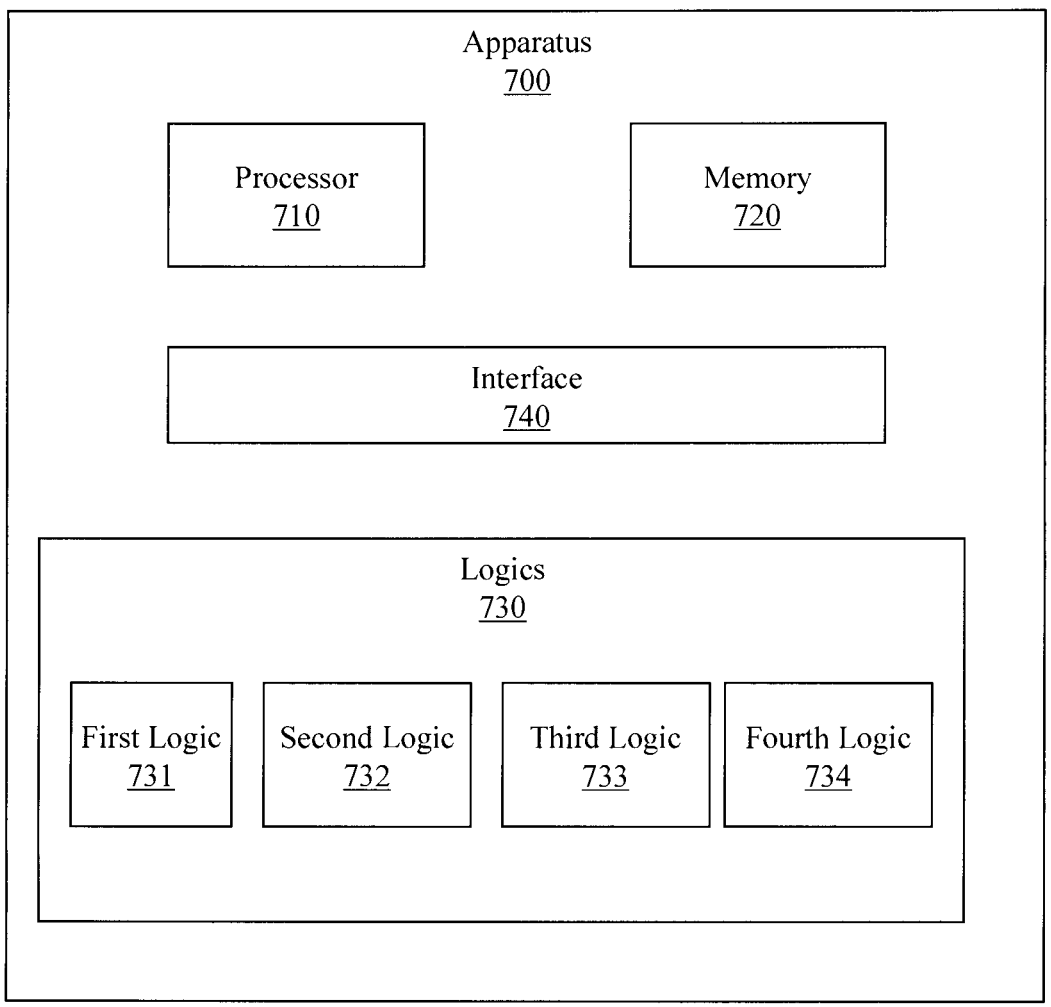
FIG. 7 illustrates an example apparatus that transfers data from an LTFS data store to a cloud data store without disrupting an application or file system.

FIG. 7 illustrates an apparatus 700 that transfers data from an LTFS data store to a cloud data store while providing uninterrupted access to the data stored by the LTFS data store. The data may be moved in an incremental fashion that results in some requests for data being satisfied from an original source (e.g., LTFS data store) while other requests for data are satisfied from a destination source (e.g., cloud data store). Apparatus 700 includes a processor 710, a memory 720, and a set 730 of logics that is connected to the processor 710 and memory 720 by an interface 740. Memory 720 may store first computer readable addresses for accessing data in the LTFS data store and second computer readable addresses for accessing corresponding data in the cloud data store. A mapping may be established between addresses for the same piece of data in the LTFS data store and the cloud data store.

The set of logics 730 transfer data from the LTFS data store to the cloud data store while providing uninterrupted access to data stored by the LTFS data store. In one embodiment, the functionality associated with the set of logics 730 may be performed, at least in part, by hardware logic components including, but not limited to, field-programmable gate arrays (FPGAs), application specific integrated circuits (ASICs), application specific standard products (ASSPs), system on a chip systems (SOCs), complex programmable logic devices (CPLDs) or more generally programmable logic devices (PLDs). In one embodiment, individual members of the set of logics 730 are implemented as PLDs. In one embodiment, the first logic 731, the second logic 732, or the third logic 733 may be PLDs, FPGA, or other integrated circuits.

The set 730 of logics includes a first logic 731 that interfaces with the LTFS data store. In one embodiment, the first logic 731 acquires computer readable electronic data from the LTFS data store using a first addressing protocol and provides computer readable electronic data to the LTFS data store using the first addressing protocol. The first addressing protocol may include a first namespace, a first address space, a first size for addresses, or other parameters. The first logic 731 may acquire the computer readable electronic data by reading from an address, reading from a network address, accepting data received through a pipe or socket, accepting data received in a function call, or in other computer based ways. The first logic 731 may provide computer readable electronic data to the LTFS data store by writing to an address, writing to a network address, providing data to a pipe or socket, providing data in a function call, or in other computer based ways.

The apparatus 700 also includes a second logic 732 that interfaces with the cloud data store. In one embodiment, the second logic 732 acquires computer readable electronic data from the cloud data store using a second, different addressing protocol and provides computer readable electronic data to the cloud data store using the second addressing protocol. The second addressing protocol may include a second namespace, a second address space, a second size for addresses, or other parameters. The second logic 732 may acquire the computer readable electronic data by reading from an address, reading from a network address, accepting data received through a pipe or socket, accepting data received in a function call, or in other computer based ways. The second logic 732 may provide computer readable electronic data to the cloud data store by writing to an address, writing to a network address, providing data to a pipe or socket, providing data in a function call, or in other computer based ways.

The apparatus 700 also includes a third logic 733 that moves data from the LTFS data store to the cloud data store. In one embodiment, the third logic 733 manipulates computer readable electronic data acquired from the LTFS data store using the first logic 731 into a form associated with the cloud data store. The form may be, for example, object-based. The third logic 733 may then use the second logic 732 to provide the manipulated computer readable electronic data to the cloud data store. Apparatus 700 operates under its own control. This means that file systems, applications, or other entities that may want to read data from the LTFS data store do not control the moving and conversion process. Thus, in one embodiment, the third logic 733 determines, independent of control from the external entity, how much data to move from the LTFS data store to the cloud data store. The third logic 733 may also determine which data to move from the LTFS data store to the cloud data store and in what order. The third logic 733 may also determine how to move data from the LTFS data store to the cloud data store or when to move data from the LTFS data store to the cloud data store. In one embodiment, the third logic 733 may adapt how, when, how much, or which data to move based, at least in part, on the data encountered in the LTFS data store.

The apparatus 700 also includes a fourth logic 734 that satisfies requests by an external entity for data stored in the LTFS data store from either the LTFS data store or the cloud data store. In one embodiment, before an occurrence of a threshold event associated with the piece of data, the fourth logic 734 satisfies requests by the external entity for a piece of data using either the first logic 731 or the second logic 732. After the occurrence of the threshold event associated with the piece of data, the fourth logic 734 satisfies requests by the external entity for a piece of data using only the second logic 732. The threshold event may be, for example, completing the movement of a certain amount (e.g., object, KiB, MiB, TiB, tape, virtual tape, tape library) of data.

Figure 8:
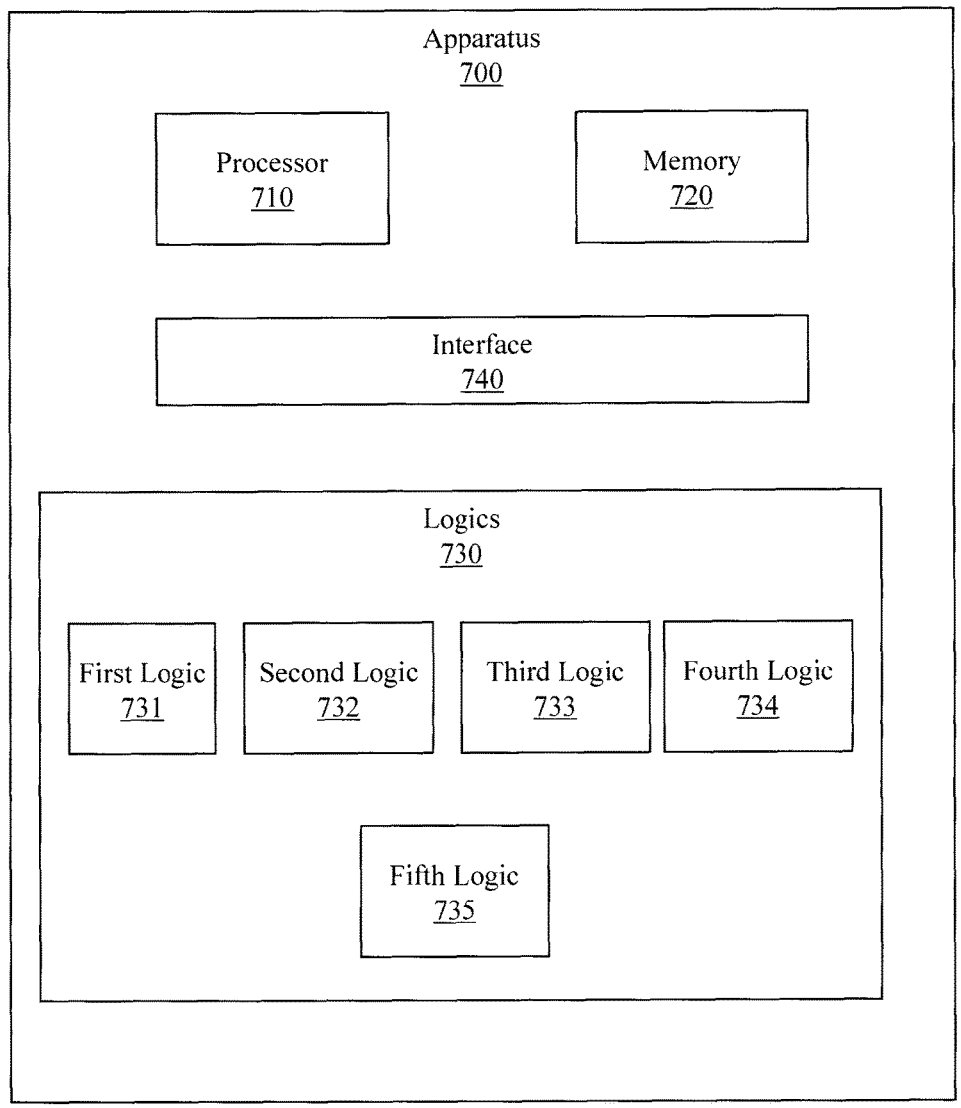
FIG. 8 illustrates an example apparatus that transfers data from an LTFS data store to a cloud data store without disrupting an application or file system.

FIG. 8 illustrates another embodiment of apparatus 700. This embodiment includes a fifth logic 735 that provides the external entity with information sufficient to convert from accessing a piece of data in the LTFS data store to accessing a corresponding piece of data in the cloud data store. For example, the fifth logic 735 may provide cloud data store addresses in response to a request for an updated address.

In one embodiment, a programmable logic device (PLD) may control movement of data from an LTFS-based repository to a cloud-based repository. The PLD includes gates that are configured to support access to data stored in the LTFS-based repository while simultaneously supporting incremental transparent migration of data from the LTFS-based repository to the cloud-based repository.

While example systems, methods, and other embodiments have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and other embodiments described herein. Therefore, the invention is not limited to the specific details, the representative apparatus, and illustrative examples shown and described. Thus, this application is intended to embrace alterations, modifications, and variations that fall within the scope of the appended claims.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and other similar terms, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable storage medium", as used herein, refers to a non-transitory medium that stores instructions and/or data. A computer-readable storage medium may take forms, including, but not limited to, non-volatile media, and volatile media. Non-volatile media may include, for example, optical disks, magnetic disks, and other disks. Volatile media may include, for example, semiconductor memories, dynamic memory, and other memories. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. A computer-readable storage medium does not refer to propagated signals.

"Data store", as used herein, refers to a physical and/or logical entity that can store data. A data store may be, for example, a database, a table, a file, a data structure (e.g. a list, a queue, a heap, a tree) a memory, a register, or other repository. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include, for example, a software controlled microprocessor, a discrete logic (e.g., ASIC), an analog circuit, a digital circuit, a programmed logic device, or a memory device containing instructions. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, or logical communications may be sent or received. An operable connection may include a physical interface, an electrical interface, or a data interface. An operable connection may include differing combinations of interfaces or connections sufficient to allow operable control. For example, two entities can be operably connected to communicate signals to each other directly or through one or more intermediate entities (e.g., processor, operating system, logic, software). Logical or physical communication channels can be used to create an operable connection.

"Signal", as used herein, includes but is not limited to, electrical signals, optical signals, analog signals, digital signals, data, computer instructions, processor instructions, messages, a bit, or a bit stream, that can be received, transmitted and/or detected.

"Software", as used herein, includes but is not limited to, one or more executable instructions that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, or programs including separate applications or code from dynamically linked libraries.

"User", as used herein, includes but is not limited to one or more persons, software, logics, applications, computers or other devices, or combinations of these.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims.

What is claimed is:

1. A non-transitory computer-readable storage medium storing computer-executable instructions that when executed by a computer cause the computer to perform a method, the method comprising:
    accessing a Linear Tape File System (LTFS)-based repository that stores data associated with a file system or an application;
    copying a piece of electronic data from the LTFS-based repository, wherein the piece of electronic data is in a first form associated with a LTFS-based format;
    producing a piece of converted electronic data from the piece of electronic data, where the piece of converted electronic data is in a second form associated with a cloud-based repository, wherein the second form is distinct from the first form;
    providing the piece of converted electronic data to the cloud-based repository;
    storing a first address at which the piece of electronic data can be retrieved from the LTFS-based repository using a first addressing scheme associated with the LTFS-based repository;
    storing a second address at which the piece of converted electronic data can be retrieved from the cloud-based repository using a second addressing scheme associated with the cloud-based repository, wherein the second addressing scheme is distinct from the first addressing scheme;
    establishing a mapping between the first address and the second address;
    selectively satisfying a request by the file system or the application for the piece of electronic data from either the LTFS-based repository or the cloud-based repository until a changeover event is detected;
    upon detecting the changeover event, satisfying a request by the file system or the application for the piece of electronic data from the cloud-based repository; and
    providing the second address to the file system or the application upon detecting the changeover event and marking the piece of electronic data from the LTFS-based repository as read-only,
    where the file system or application run on a different computer than the method,
    where the method is transparent to the file system or the application,
    where the method is performed independent of the file system or application, and
    where the method continues until a selected amount of data is moved from the LTFS-based repository to the cloud-based repository.

2. The non-transitory computer-readable storage medium of claim 1, the method comprising maintaining a set of mappings between members of a first set of addresses associated with the LTFS-based repository and a second set of addresses associated with the cloud-based repository after the changeover event is detected.

3. The non-transitory computer-readable storage medium of claim 1, where producing the piece of converted electronic data comprises storing the piece of electronic data in an object.

4. The non-transitory computer-readable storage medium of claim 3, where the changeover event is the creation of a complete object.

5. The non-transitory computer-readable storage medium of claim 1, where the changeover event is the copying of a complete file from the LTFS-based repository.

6. The non-transitory computer-readable storage medium of claim 1, where the changeover event is the copying of a complete tape associated with the LTFS-based repository or the copying of a complete tape library associated with the LTFS-based repository.

7. The non-transitory computer-readable storage medium of claim 1, where the changeover event is dynamically established based, at least in part, on the data being copied and converted.

8. The non-transitory computer-readable storage medium of claim 1, where the LTFS-based repository includes a virtual tape.

9. The non-transitory computer-readable storage medium of claim 1, the method comprising deleting a set of mappings between members of a first set of addresses associated with the LTFS-based repository and a second set of addresses associated with the cloud-based repository after the changeover event is detected.

10. The non-transitory computer-readable storage medium of claim 1, the method comprising generating a changeover event for each quanta of data moved from the LTFS-based repository to the cloud-based repository until the selected amount of data has been moved from the LTFS-based repository to the cloud-based repository.

* * * * *